(12) United States Patent
Sandstrom

(10) Patent No.: US 9,133,371 B2
(45) Date of Patent: Sep. 15, 2015

(54) RUBBER CEMENT AND TIRE WITH FABRICATED TIRE TREAD

(71) Applicant: The Goodyear Tire & Rubber Company, Akron, OH (US)

(72) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 141 days.

(21) Appl. No.: 13/744,584

(22) Filed: Jan. 18, 2013

(65) Prior Publication Data

US 2014/0202608 A1    Jul. 24, 2014

(51) Int. Cl.
| | |
|---|---|
| *B60C 1/00* | (2006.01) |
| *B60C 11/00* | (2006.01) |
| *B29D 30/52* | (2006.01) |
| *C09J 109/00* | (2006.01) |
| *B29D 30/08* | (2006.01) |
| *C08K 3/36* | (2006.01) |
| *C08K 5/01* | (2006.01) |
| *C08K 5/5419* | (2006.01) |
| *C08K 5/548* | (2006.01) |
| *C08L 7/00* | (2006.01) |
| *C08L 9/00* | (2006.01) |
| *B29D 30/54* | (2006.01) |

(52) U.S. Cl.
CPC .............. *C09J 109/00* (2013.01); *B29D 30/08* (2013.01); *B60C 1/0016* (2013.04); *C08K 3/36* (2013.01); *C08K 5/01* (2013.01); *C08K 5/548* (2013.01); *C08K 5/5419* (2013.01); *C08L 7/00* (2013.01); *C08L 9/00* (2013.01); *B29D 2030/544* (2013.01); *Y10T 152/10495* (2015.01)

(58) Field of Classification Search
CPC .... B60C 11/00; B60C 11/0008; B29D 30/52; B29C 53/42
See application file for complete search history.

(56) References Cited

U.S. PATENT DOCUMENTS

| | | | | |
|---|---|---|---|---|
| 3,335,041 | A | 8/1967 | Osbourne | 156/110 |
| 3,342,238 | A | 9/1967 | Weinstock et al. | 152/330 |
| 3,421,565 | A | 1/1969 | Reinbold | 152/330 |
| 3,514,423 | A | 5/1970 | Reinbold | 260/33.6 |
| 3,622,534 | A * | 11/1971 | Timmons et al. | 524/216 |
| 3,853,692 | A * | 12/1974 | Clayton et al. | 523/216 |
| 4,463,120 | A | 7/1984 | Collins et al. | 524/274 |
| 4,474,908 | A | 10/1984 | Wagner | 523/213 |
| 4,539,365 | A | 9/1985 | Rhee | 524/495 |
| 4,666,981 | A * | 5/1987 | Doura et al. | 525/100 |
| 5,356,994 | A * | 10/1994 | Koch | 525/98 |
| 5,780,538 | A | 7/1998 | Cohen et al. | 524/494 |
| 5,916,981 | A * | 6/1999 | Cifuentes et al. | 525/477 |
| 6,127,468 | A | 10/2000 | Cruse et al. | 524/225 |
| 6,573,324 | B1 * | 6/2003 | Cohen et al. | 524/492 |
| 8,143,338 | B1 | 3/2012 | Pompei et al. | 524/474 |

FOREIGN PATENT DOCUMENTS

| | | | |
|---|---|---|---|
| EP | 104812 | 4/1984 | ............. B29H 17/36 |
| EP | 2213477 | 8/2010 | ............... C08K 3/36 |
| EP | 2457741 | 5/2012 | ............... B60C 1/00 |
| EP | 2463333 | 6/2012 | ............... C08K 5/01 |
| GB | 806027 | * 12/1958 | |
| JP | 6-896 | * 1/1994 | |
| JP | 2006241346 | 9/2006 | ............. C09J 109/06 |
| JP | 2006265391 | 10/2006 | ................ C08L 9/00 |
| KR | 20040018006 | 3/2004 | ............. C09J 121/00 |
| KR | 100429070 | * 4/2004 | |

OTHER PUBLICATIONS

European Search Report received by Applicant Jun. 16, 2014.

* cited by examiner

*Primary Examiner* — Justin Fischer
(74) *Attorney, Agent, or Firm* — Henry C. Young, Jr.

(57) ABSTRACT

The invention relates to a rubber cement, fabricated tire tread and resulting tire, where the tire tread is fabricated by joining ends of an uncured rubber strip together with a silica coupler-containing rubber cement between opposing ends of the uncured tread rubber strip where the rubber strip contains a high content of hydrophobated precipitated silica and where the cement contains a silica coupling agent.

5 Claims, No Drawings

RUBBER CEMENT AND TIRE WITH FABRICATED TIRE TREAD

FIELD OF THE INVENTION

This invention relates to a rubber cement, fabricated tire tread and resulting tire, where the tire tread is fabricated by joining ends of an uncured rubber strip together with a silica coupler-containing rubber cement between opposing ends of the uncured tread rubber strip where the rubber strip contains a high content of hydrophobated precipitated silica and where the cement contains a silica coupling agent.

BACKGROUND OF THE INVENTION

Rubber tires are often prepared in a manufacturing process by first building a tire carcass and then building a tire tread over the carcass. The tire tread is conventionally applied to the tire carcass as a usually contoured, uncured rubber strip which is wound around the carcass with the ends of the uncured rubber strip meeting to form a splice. The ends of the uncured rubber tread strip for a new tire are usually skived, or cut, at an angle to permit the ends of the uncured rubber strip to overlay (overlap) each other to some degree, instead of a straight cut in a form of a butt splice, to form a splice comprised of joined ends of the uncured rubber tread strip. Such tire tread fabrication utilizing a splice to join the ends of an uncured tread rubber strip is well known to those having skill in such art.

For such practice, the ends of the uncured rubber tread strip are desired to have a degree of tackiness, sometimes referred to as building tack, so that the tread splice holds together after its construction and is suitable for a subsequent tire building and cure. However, for such splice, the ends of the uncured rubber tread strip often do not have sufficient desirable natural building tack for such purpose so that a rubber cement is applied to at least one end of the rubber strip to aid in promoting building tack. For example, see U.S. Pat. No. 8,143,338.

Providing suitable building tack to an end of an uncured tread rubber strip is considered to be significantly more challenging where the rubber composition contains a high content of precipitated silica, namely a hydrophobated precipitated silica, where the content of such silica in the rubber composition significantly approaches or particularly exceeds the content of elastomer itself. Such high content of hydrophobated silica significantly is considered to reduce the building tack of the uncured rubber composition.

In practice, precipitated silica (an amorphous synthetic silica) is hydrophilic in nature and thereby challenging to efficiently blend and disperse within diene-based elastomers unless it is made more hydrophobic in nature as is well known to those having skill in such art. Such hydrophilic precipitated silica may, for example, be hydrophobated in situ within the rubber composition or may be pre-hydrophobated prior to its addition to a rubber composition. For example, see U.S. Pat. Nos. 4,474,908, 5,780,538, 6,127,468 and 6,573,324.

The precipitated silica may be hydrophobated for example, with one or more hydrophobation promoting compounds which are reactive with hydroxyl groups (e.g. silanol groups) contained on the precipitated silica which may be comprised of, for example, one or more of alkoxysilanes, alkylsilanes, halogenated alkylsilanes, and silica coupling agents such as, for example, bis(3-alkoxysilylalkyl)polysulfides containing an average of from about 2 to about 4 connecting sulfur atoms in their polysulfidic bridge ((e.g. comprised of bis(3-ethoxysilylpropyl)polysulfide), or an organoalkoxymercaptosilane.

It is understood that such hydrophobation promoting compounds rely, at least in part, upon reaction of its silane or siloxane moiety with hydroxyl groups (e.g. silanol groups) on the precipitated silica. For such reaction, it is understood that not all of the hydroxyl groups of the precipitated silica become chemically reacted with such compounds and that therefore a portion of the hydroxyl groups on the precipitated silica remain as available hydroxyl groups for further chemical reaction(s).

Historically, as previously indicated, an adhesive coating, sometimes referred to as a cement, is often applied to at least one face, or end surface, of the opposing ends of an uncured tire tread rubber strip to promote building tack and the ends joined to form a splice with the cement coating promoting suitable building tack between the ends of the uncured rubber tread strip to hold the tread splice together during the tire building process. For such procedure, a coating of a solvent based adhesive rubber composition, sometimes referred to as cement, is often applied to one, and sometimes both, faces of the opposing uncured tire tread ends. Alternatively, water based adhesives (cements) are sometimes used, but they require longer periods of time for drying than desired during the tire building process, to allow for water removal prior to the curing of the tire in a tire mold.

For this invention, it is desired to undertake providing building tack to the ends of such uncured rubber tread strip which contains a high content of particulate hydrophobated precipitated silica, namely an uncured tread rubber strip comprised of a rubber composition having a hydrophobated precipitated silica content at least about 70 weight percent, alternately at least about 105 weight percent and alternately at least about 175 weight percent based on its rubber content.

On such basis, then, it is desired for the building tack promoting cement to interact with the hydrophobated silica as well as the elastomer of the uncured rubber strip, particularly with the ends of the uncured rubber strip joined together to form a splice.

Historically, examples of various cements for such purpose and tread splices created by joining a ends of rubber composition, in general, may be referred to in, for example, and not intended to be limiting, one or more of U.S. Pat. Nos. 3,335,041; 3,421,565; 3,342,238; 3,514,423; 4,463,120, 4,539,365 and 8,143,338. It is readily observed that such exemplary cements are typically based on, for example, solvent solutions of compositions comprised of, for example, a base rubber, hydrocarbon oil, carbon black, tackifier resin and curative. However, no consideration is seen to have been given to adapting a rubber cement to promote building tack for ends of a tread rubber strip containing high content of hydrophobated precipitated silica which can be greater than the elastomer(s) contained in the rubber composition.

In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art.

SUMMARY AND PRACTICE OF THE INVENTION

In accordance with this invention, a cement (for fabrication, for example, of a tire tread for a tire by application to at least one end of uncured rubber tread strip and forming a splice thereof with the cement between the ends of the uncured rubber strip) comprises, based on parts by weight per 100 parts by weight rubber (phr):

(A) at least one diene-based elastomer, (B) about 500 to about 4000, alternately from about 600 to about 3000, phr of an organic solvent having a vapor pressure of less than 0.01 kPa at 20° C., where the solvent is comprised of a petroleum distillate having a boiling point of at least 220° C. and desirably in a range of from about 230° C. to about 270° C., (C) silica coupling agent having a moiety interactive with said diene-based elastomer(s) and another moiety reactive with hydroxyl groups (e.g. silanol groups) contained on precipitated silica and hydrophobated precipitated silica, where said silica coupling agent is comprised of at least one of:

(1) bis(3-trialkylsilylpropyl)polysulfide containing an average of from about 2 to about 4 connecting sulfur in its polysulfidic bridge, and (2) organoalkoxymercaptosilane, and (D) sulfur and at least one sulfur cure accelerator;

wherein said cement has minimal silica or is exclusive of silica (including precipitated silica and hydrophobated precipitated silica).

In one embodiment, said cement contains from about 2 to about 25, alternately from about 5 to about 15 phr of resin comprised of at least one of hydrocarbon resin, phenol/acetylene resin and rosin derived resin.

In an additional embodiment, said cement contains from about 5 to about 100, alternately from about 10 to about 70 phr of rubber reinforcing carbon black.

In an additional embodiment, said cement can contain 2 to 30 phr silica, whereas in most cases silica is not preferred to be present.

In a further embodiment, said cement contains zinc oxide and fatty acid comprised of at least one of stearic, palmitic and oleic acid.

In another embodiment, said cement contains from about 1 to about 50, alternately from about 5 to about 25, phr of rubber processing oil. Such oil may, for example, be comprised of at least one of aromatic, paraffinic, naphthenic and vegetable oils.

Representative of the aforesaid hydrocarbon resins include coumarone-indene resins, petroleum derived resins, terpene polymers and mixtures thereof.

For such resins, coumarone-indene resins are commercially available in many forms with melting points ranging from 10 to 160° C. (as measured by the ball-and-ring method). Preferably, the melting point ranges from 30 to 100° C. Coumarone-indene resins are well known.

Hydrocarbon resins are, in general, petroleum resins commercially available with softening points ranging from 10° C. to 120° C. Preferably, the softening point ranges from 30 to 100° C. Suitable petroleum resins include both aromatic and nonaromatic resins. Some of such resins have a low degree of unsaturation and high aromatic content, and some are highly unsaturated and yet some contain no aromatic structure at all. Differences in the resins are largely due to the olefins in the feedstock from which the resins are derived. Conventional derivatives in such resins include dicyclopentadiene, cyclopentadiene, their dimers and diolefins such as isoprene and piperylene.

Terpene polymers are produced by polymerizing beta pinene which may be contained in mineral spirits. The resin may be provided in a variety of melting points ranging, for example, from about 10° C. to 135° C. The terpene polymers may also, for example, be a copolymer of beta pinene and diclopentadiene.

Phenol/acetylene resins may be used. Phenol/acetylene resins may be derived, for example, by the addition of acetylene to an alkyl phenol such as for example butyl phenol, in the presence of, for example, zinc naphthalate.

Historically, rosin acid, which might sometimes be referred to as "rosin", is a solid resinous material (at 23° C.) which contains a high concentration of carboxylic acid groups which occurs naturally in pine trees. There are three major exemplary sources of the rosin acid which might be referred to as gum, wood and tall oil rosin.

Gum rosin acid, which might be referred to as "rosin", is typically from the oleoresin extrudate of the living pine tree.

Wood rosin acid, which might be referred to as "wood rosin" or "rosin", is typically from the oleoresin contained in the aged pine tree stumps.

Tall oil rosin acid, which might be referred to as "rosin", is typically from the waste liquor recovered as a by-product in the paper production industry.

For example, wood rosin may be obtained from aged pine tree stumps. In such practice, a pine tree stump may be allowed to remain in the ground for a number of years so that its bark and sapwood may decay and slough off to leave the heartwood rich in rosin acid, which might sometimes be referred to as "wood rosin".

Historically, rosin acids derived from both oleoresin and aged pine tree stump wood are typically composed of, for example, about 90 percent rosin acids and, for example, about 10 percent nonacidic components.

Representative of various wood rosin acids are, for example, rosin acids referred to as abietic, levopimaric, neoabietic, palustric, dehydroabietic, dihydroabietic, tetrahydroabietic, pimaric, isopimaric, elliotinoic and sandaracopimaric.

The mixing and preparation of the cement composition can be accomplished by methods known to those having skill in the rubber mixing art.

In further accordance with the invention a pneumatic tire is provided which comprises an assembly of uncured rubber components including an outer circumferential uncured tread rubber strip with opposing ends of said tread rubber strip joined to form a splice which includes said cement between said opposing ends of said rubber strip (to promote building tack for the opposing ends of said uncured tread rubber strip), where the rubber composition of said uncured tread rubber strip is comprised of, based on parts by weight per 100 parts by weight of rubber (phr):

(A) 100 phr of at least one sulfur curable diene-based elastomer, and (B) about 70 to about 200, alternately from about 105 to about 175, phr of hydrophobated precipitated silica;

wherein said hydrophobated precipitated silica is comprised of amorphous synthetic precipitated silica (precipitated silica) hydrophobated with:

(1) at least one silica coupling agent comprised of:

(a) bis(3-trialkoxysilylalkyl)polysulfide containing an average from about 2 to about 4 connecting sulfur atoms in its polysulfidic bridge (e.g. comprised of bis(3-triethoxysilylpropyl)polysulfide, or (b) alkoxyorganomercaptosilane, and optionally (3) at least one alkoxysilane.

It is appreciated that said precipitated silica may be hydrophobated prior to its addition to the rubber composition or hydrophobated in situ within the rubber composition.

The assembly of uncured rubber components, including the spliced ends of said circumferential uncured tread rubber strip with the cement therebetween, is sulfur cured to form the pneumatic tire.

In further accordance with this invention, for the tire preparation, a method of preparing a tire by joining opposing ends of the uncured tread rubber strip on the tire which comprises applying said cement as a coating thereof to at least one surface of the opposing ends of the uncured tire tread rubber strip to promote building tack for tread strip ends and the uncured tread rubber strip ends then joined together to form a splice.

In one embodiment, the method comprises heating the cement coating on an end of the uncured rubber strip, prior to joining the strip ends form the splice, to a temperature, for example in a range of from about 80° C. to about 150° C., which is well below the boiling point of the solvent of the cement. A purpose is to soften the rubber composition at the end of the uncured rubber strip to enhance providing an associated building tack. Such heating may be provided, for example, by at least one of infrared and hot air treatment directed to the coating on the associated end of the uncured rubber strip and is short enough in duration time to not pre-cure the splice surface.

A significant aspect of the invention is for cement to promote building tack for joining the opposing ends of the uncured tread rubber strip having a high content of hydrophobated precipitated silica which can exceed the content of rubber in the tread strip rubber composition in a manner for the cement (which contains a silica coupling agent without silica itself) to interact with the available remaining hydroxyl groups of hydrophobated silica contained in the uncured tread rubber strip rubber composition as well as the elastomer of the uncured tread rubber strip, in order to promote building tack between opposing ends of the uncured rubber strip for joining them together to form a splice.

In one embodiment, said diene based elastomer(s) is comprised of at least one polymer of at least one of isoprene and 1,3-butadiene and styrene with at least one of isoprene and 1,3-butadiene.

Representative of such elastomers are, for example, cis 1,4-polyisoprene, cis 1,4-polybutadiene, styrene/butadiene and styrene/isoprene/butadiene terpolymers.

Representative of such elastomers are, for example, cis 1,4-polyisoprene, cis 1,4-polybutadiene, styrene/butadiene and styrene/isoprene/butadiene terpolymers.

In one embodiment, an elastomer (e.g. a styrene/butadiene rubber) may be a tin or silicon coupled elastomer.

In one embodiment, an elastomer may be a functionalized elastomer (e.g. a styrene/butadiene rubber) containing, for example, at least one functional group comprised of amine, siloxy, carboxyl and hydroxyl groups, particularly functional groups. Such functional groups may be reactive with, for example, hydroxyl groups on a synthetic amorphous silica such as, for example, a precipitated silica.

In one embodiment, an elastomer may be a tin or silicon coupled elastomer (e.g. a styrene/butadiene rubber) containing at least one functional group comprised of, for example, amine, siloxy, carboxyl and hydroxyl groups. Such functional groups may be reactive with hydroxyl groups of a precipitated silica, including hydrophobated precipitated silica.

The commonly employed precipitated silica are, for example, silicas by the acidification of a soluble silicate, e.g., sodium silicate.

Such conventional precipitated silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is well known by those having skill such art.

Various commercially available silicas may be used, such as, and without limitation, silicas commercially available from PPG Industries under the Hi-Sil trademark with designations 210, 243, etc.; silicas available from Rhodia, with, for example, designations of Z1165MP and Z165GR and silicas available from Evonik with, for example, designations VN2 and VN3, etc.

Commonly employed rubber reinforcing carbon blacks for the cement composition and for the rubber composition are illustrated in *The Vanderbilt Rubber Handbook*, the Fourteenth Edition, April 2010. Representative examples of such carbon blacks include for example and according to their ASTM designations, N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. Such rubber reinforcing carbon blacks may, for example, have iodine absorptions (ASTM D1510) ranging from 9 to 145 g/kg and DBP number (ASTM D2414) ranging from 34 to 150 cc/100 g.

As known to those skilled in the art, depending on the intended use of the sulfur vulcanizable rubber compositions, the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used, for example, in an amount ranging from 1 to 8 phr. Typical amounts of tackifier resins, if used, may comprise about 5 to about 20 phr. Typical amounts of antioxidants may comprise for example about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants may comprise for example about 1 to 5 phr. Typical amounts of fatty acids, which may comprise, for example, one or more of stearic, palmitic and oleic acid in an amount of, for example, from about 1 to about 5 phr. Typical amounts of zinc oxide may comprise for example from about 1 to about 5 phr.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging, for example, from about 0.5 to about 5 phr. In another embodiment, combinations of a primary and a secondary accelerator might be used with the secondary accelerator being used in smaller amounts, such as, for example, from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are, for example, amines, disulfides, guanidines, thioureas, thiazoles, thiurams, sulfenamides, dithiocarbamates and xanthates.

The cement may be applied to the surface of at least one opposing end of an uncured tread rubber strip using any of the various application methods as are known in the art, including but not limited to spraying, brushing, dipping, and wiping.

While in accordance with the patent statutes the best mode and preferred embodiment has been set forth, the scope of the invention is not limited thereto, but rather by the scope of the attached claims.

What is claimed is:

1. A pneumatic tire which contains a circumferential tread rubber strip with its ends joined through a rubber cement to form a splice wherein the tread rubber contains a precipitated silica which has been pre-hydrophobated with a silica coupling agent and where the rubber cement contains a silica coupling agent without a silica, wherein the pneumatic tire comprises an assembly of uncured rubber components including an outer circumferential uncured tread rubber strip with opposing ends of said tread rubber strip joined to form a splice which includes a cement between said opposing ends of said rubber strip, where the rubber composition of said uncured tread rubber strip is comprised of, based on parts by weight per 100 parts by weight of rubber (phr):

(A) 100 phr of at least one sulfur curable diene-based elastomer, and (B) about 70 to about 200 phr of pre-hydrophobated precipitated silica;

wherein said pre-hydrophobated precipitated silica is comprised of precipitated silica pre-hydrophobated with:

(1) at least one silica coupling agent comprised of:
 (a) bis(3-trialkoxysilylalkyl)polysulfide containing an average from about 2 to about 4 connecting sulfur atoms in its polysulfidic bridge polysulfide, or
 (b) alkoxyorganomercaptosilane, and optionally
(2) at least one alkoxysilane wherein said cement is exclusive of silica and is comprised of, based on parts by weight per 100 parts by weight rubber (phr):

(C) at least one diene-based elastomer, (D) about 500 to about 4000 phr of an organic solvent having a vapor pressure of less than 0.01 kPa at 20° C., where the solvent is comprised of a petroleum distillate having a boiling point of at least 220° C., (E) silica coupling agent comprised of at least one of:
 (1) bis(3-trialkylsilylpropyl)polysulfide containing an average of from about 2 to about 4 connecting sulfur in its polysulfidic bridge, and
 (2) organoalkoxymercaptosilane, (F) sulfur and at least one sulfur cure accelerator, and (G) from about 2 to about 15 phr of resin comprised of at least one of coumarone-indene resin, petroleum derived resin, terpene polymer, hydrocarbon resin, phenol/acetylene resin and rosin derived resin.

2. A sulfur cured tire assembly of claim 1 to form a pneumatic tire.

3. The tire of claim 1 wherein said diene-based elastomer is comprised of at least one of cis 1,4-polyisoprene, cis 1,4-polybutadiene and styrene/butadiene elastomers.

4. The tire of claim 3 wherein said styrene/butadiene elastomer of said tread rubber is a functionalized elastomer which contains at least one functional group comprised of at least one of amine, siloxy and carboxyl groups.

5. The tire of claim 4 wherein said functionalized styrene/butadiene elastomer is tin or silicon coupled.

* * * * *